United States Patent
Haggar et al.

(10) Patent No.: US 6,820,183 B2
(45) Date of Patent: Nov. 16, 2004

(54) METHODS, SYSTEMS, AND COMPUTER PROGRAM PRODUCTS FOR MEMORY POOL MANAGEMENT USING VARIABLE SIZE SUB-POOLS

(75) Inventors: Peter F. Haggar, Raleigh, NC (US); James A. Mickelson, Cary, NC (US); David M. Wendt, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 258 days.

(21) Appl. No.: 09/755,241

(22) Filed: Jan. 5, 2001

(65) Prior Publication Data
US 2002/0091904 A1 Jul. 11, 2002

(51) Int. Cl.[7] .................................................. G06F 12/00
(52) U.S. Cl. ........................................ 711/170; 711/153
(58) Field of Search ......................... 711/170–173, 153; 707/100, 103 R–103 Z, 205, 206; 709/215

(56) References Cited

U.S. PATENT DOCUMENTS

| | | | | |
|---|---|---|---|---|
| 4,989,134 A | * | 1/1991 | Shaw | 364/200 |
| 5,367,637 A | | 11/1994 | Wei | 395/250 |
| 5,889,990 A | * | 3/1999 | Coleman et al. | 395/682 |
| 5,900,001 A | | 5/1999 | Wolczko et al. | 707/206 |
| 6,065,019 A | | 5/2000 | Ault et al. | 707/206 |
| 6,131,150 A | * | 10/2000 | DeTreville | 711/173 |
| 6,173,294 B1 | * | 1/2001 | Azagury et al. | 707/206 |
| 6,421,769 B1 | * | 7/2002 | Teitenberg et al. | 711/170 |

OTHER PUBLICATIONS

Venners, Aug. 1996, JavaWorld, Java's Garbage–Collected Heap.*

* cited by examiner

*Primary Examiner*—Kimberly McLean-Mayo
(74) *Attorney, Agent, or Firm*—Myers Bigel Sibley & Sajovec, P.A.; Gerald R. Woods (57) ABSTRACT

Memory pool management may be provided by allocating storage blocks and handles in different parts of a larger memory pool. Two variable size sub-pools may be provided within the memory pool: a storage block sub-pool and a handle sub-pool. Each sub-pool has a variable size and may be allowed to grow until their combined size reaches the size of the memory pool. Both sub-pools may be allowed to grow into the same unused memory space. When a memory request is received from a program, the storage block sub-pool and handle sub-pool may be enlarged to accommodate the request. A storage block and a handle may be allocated to the program from the storage block and handle sub-pools, respectively.

11 Claims, 5 Drawing Sheets

METHODS, SYSTEMS, AND COMPUTER PROGRAM PRODUCTS FOR MEMORY POOL MANAGEMENT USING VARIABLE SIZE SUB-POOLS

FIELD OF THE INVENTION

The present invention relates generally to the field of data processing systems, methods, and computer program products, and, more particularly, to managing a memory pool.

BACKGROUND OF THE INVENTION

Data processing systems, methods, and/or computer program products may reserve a portion of memory, which may be referred to as a "heap," for use by a program for the temporary storage of data and/or information whose existence or size may not be able to be determined until the program executes. For example, in object oriented software systems, an instantiation of a class, i.e., an object, may be allocated in the heap. To facilitate access of objects, a "handle" may be associated with each object that is allocated in the heap and these handles may also be allocated in the heap. A handle contains a pointer (i e., the address of the associated object in the heap) and information for the object with which it is associated. Thus, programs may reference objects indirectly using the respective handles that are associated therewith rather than referencing the objects directly in the heap. One advantage to this approach is that as objects are relocated in the heap to defragment the heap memory region, only the pointers used by the handles in the heap need be updated.

One example of an object oriented programming language is the Java programming language, which has been developed by Sun Microsystems, Mountain View, Calif. Java is a portable and architecturally neutral language. Java source code is compiled into a machine independent format that may be run on machines configured with a Java runtime system known as a Java Virtual Machine (JVM). The JVM is defined as an imaginary machine that is implemented by emulating a processor through the use of software on a real machine. Accordingly, machines running under diverse operating systems, including UNIX and Windows NT, having a JVM can execute the same Java program.

The JVM uses a heap for allocation of both objects and handles that are associated therewith. To improve the management of the heap memory, the heap may be separated into a handle sub-pool and an object sub-pool. Each sub-pool is typically given a fixed size that when combined comprises the entire heap memory. Unfortunately, dividing the heap into multiple, fixed size sub-pools may result in a lower utilization of the heap memory region. For example, the object sub-pool may run out of space while the handle sub-pool still has space available. Conversely, the handle sub-pool may run out of space while the object sub-pool still has space available. An optimal division of the heap memory between the handle and object sub-pools may be difficult to attain because the optimal division may vary during runtime as Java applications vary their object usage.

In view of the foregoing, there exists a need for improvements in management of memory pools, such as heap memory.

SUMMARY OF THE INVENTION

According to embodiments of the present invention, memory pool management may be provided by allocating storage blocks and handles in different parts of a larger memory pool. Two variable size sub-pools may be provided within the memory pool: a storage block sub-pool and a handle sub-pool. Each sub-pool has a variable size and may be allowed to grow until their combined size reaches the size of the memory pool. Both sub-pools may be allowed to grow into the same unused memory space. As a result, improved utilization of the memory pool space may be achieved. When a memory request is received from a program, the storage block sub-pool and handle sub-pool may be enlarged to accommodate the request. A storage block and a handle may be allocated to the program from the storage block and handle sub-pools, respectively.

In accordance with embodiments of the present invention, handles are allocated starting at one end of the memory pool and storage blocks are allocated starting at the other end of the memory pool. Each sub-pool has a variable size and is allowed to grow until their combined size reaches the size of the memory pool. Preferably, a determination is made whether the handle sub-pool contains any deallocated handles before enlarging the size of the handle sub-pool to accommodate a new storage block request. As a result, the present invention may provide for improved utilization of a memory pool. Handles and storage blocks generally have different characteristics: handles are typically small and have a fixed size; storage blocks may vary both in size and usage. By allocating handles and storage blocks in separate, variable sized sub-pools, each data type may be allowed to consume and release memory in accordance with the requirements of a particular application. New handles and storage blocks may be allocated until the memory pool is filled. Inasmuch as the memory pool is shared between handles and storage blocks, the problem of having a full memory pool even though space is still available in one of the sub-pools may be avoided. In addition, the improved utilization of the memory pool may allow for a smaller memory pool size, which conserves memory.

In accordance with further embodiments of the present invention, if there is insufficient memory in the memory pool to grant a storage block request, the memory pool may be examined to determine if there are any storage blocks that are no longer in use. The operation of examining a region in memory and reclaiming unused portions for reuse is often referred to as "garbage collection." Note that garbage collection may also be implemented as a background process to be performed on a periodic basis. If one or more storage blocks are detected as being no longer in use, these storage block(s) and their associated handle(s) may be deallocated. The storage block sub-pool may then be compacted towards one end of the memory pool to remove the storage blocks that are no longer in use from the storage block sub-pool and to consolidate those storage blocks that are no longer in use into a larger block of available memory in the middle of the memory pool. This compaction of the storage block sub-pool may avoid the problems associated with memory fragmentation.

Because the handles are a fixed size, the handle sub-pool may not suffer from memory fragmentation problems. Handles that are deallocated during garbage collection may be reused. For example, when a new handle is requested, it may be allocated from existing space within the handle sub-pool. Thus, the size of the handle sub-pool grows only when there are no idle (i.e., deallocated) handles available in the handle sub-pool to fulfill a request.

The present invention may, therefore, be used to control utilization of a memory pool through use of variable size sub-pools that are allowed to grow until the memory pool is full. Because of the improved memory pool utilization provided by the present invention, garbage collection may be run less frequently to free up memory in the memory pool. Accordingly, processor resources may be conserved.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF THE PROFFERED EMBODIMENTS

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. Like reference numbers signify like elements throughout the description of the figures.

The present invention is described herein in the context of providing improved management of a memory pool, e.g., heap memory, which is used by programs running under a Java Virtual Machine (JVM). It will be understood that the present invention is not limited to memory management of a JVM heap, but is applicable in general to a memory pool in which storage blocks are separately allocated from a plurality of sub-pools that are defined or provided within the memory pool.

The present invention may be embodied as methods, systems, and/or computer program products. Accordingly, the present invention may be embodied in software (including firmware, resident software, micro-code, etc.). Furthermore, the present invention may take the form of a computer program product on a computer-usable or computer-readable storage medium having computer-usable or computer readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer usable or computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted or otherwise processed in a suitable manner if necessary, and then stored in a computer memory.

Figure 1:
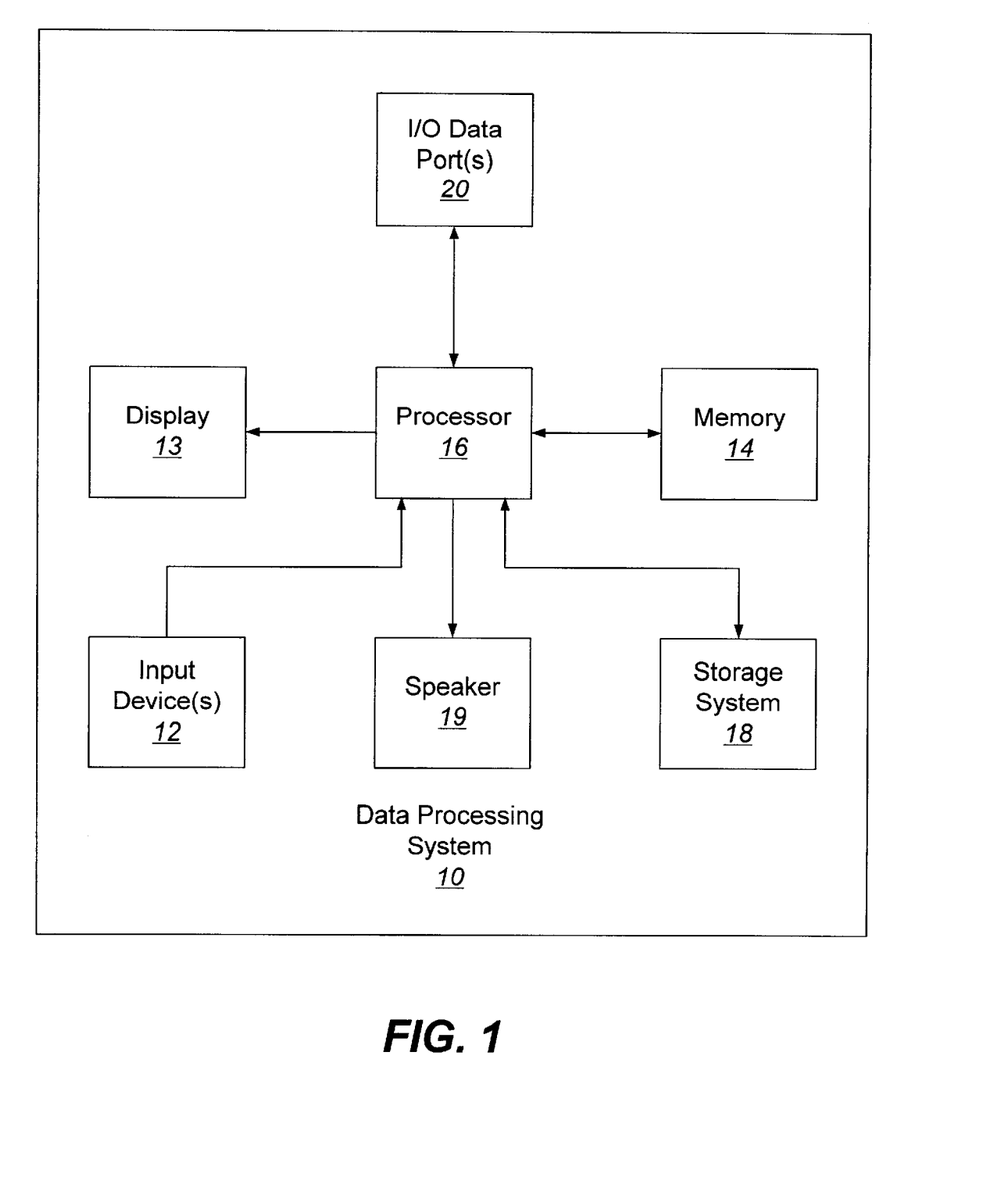
FIG. 1 is a block diagram that illustrates data processing systems in accordance with embodiments of the present invention

Referring now to FIG. 1, an exemplary data processing system 10 in accordance with embodiments of the present invention typically includes input device(s) 12, such as a keyboard or keypad, a display 13, and a memory 14 that communicate with a processor 16. The data processing system 10 may further include a storage system 18, a speaker 19, and an I/O data port(s) 20 that also communicate with the processor 16. The storage system 18 may include removable and/or fixed media, such as floppy disks, ZIP drives, hard disks, or the like as well as virtual storage such as a RAMDISK. The I/O data port(s) 20 may be used to transfer information between the data processing system 10 and another computer system or a network (e.g., the Internet). These components may be conventional components such as those used in many conventional computing devices, which may be configured to operate as described herein.

Figure 2:
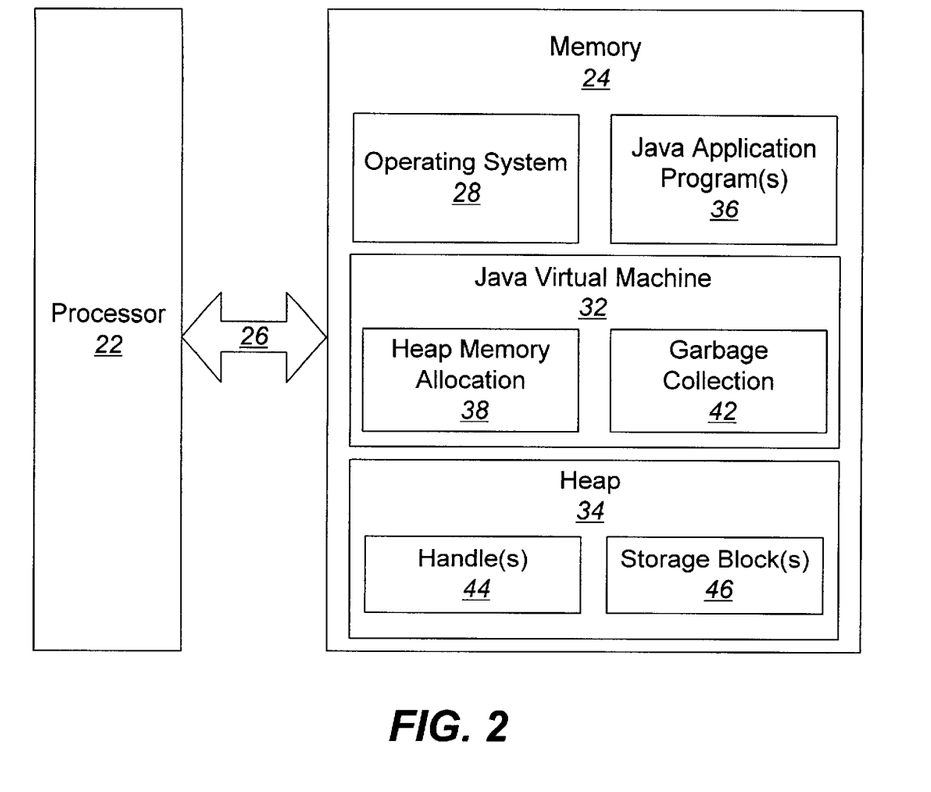
FIG. 2 is a block diagram that illustrates a processor and a memory that is configured with source code for managing a memory pool in accordance with embodiments of the present invention.

FIG. 2 illustrates a processor 22 and a memory 24 in accordance with embodiments of methods, systems, and computer program products for managing a memory pool that may be used in embodiments of data processing systems of FIG. 1. The processor 22 communicates with the memory 24 via an address/data bus 26. The processor 22 may be, for example, a commercially available or custom microprocessor. The memory 24 is representative of the overall hierarchy of memory devices containing the software and data used to implement memory pool management in accordance with the present invention. The memory may include, but is not limited to, the following types of devices: cache, ROM, PROM, EPROM, EEPROM, flash, SRAM, and DRAM.

As shown in FIG. 2, the memory 24 may hold at least four major categories of software and data: the operating system 28, the Java Virtual Machine (JVM) 32, the heap 34, and the Java application program(s) 36. The operating system 28 controls the operation of the computer system. In particular, the operating system 28 may manage the computer system's resources and may coordinate execution of programs by the processor 22. The JVM 32, as described hereinabove, comprises software programs that emulate the processor 22 to allow the Java application programs 36 to execute on the processor 22 for a variety of different types of operating system types (e.g., UNIX, Windows NT, etc.).

In accordance with embodiments of the present invention, the JVM 32 may include a heap memory allocation module 38 and a garbage collection module 42. The heap memory allocation module 38 may be configured to process requests from the Java application programs 36 for a storage block in the heap 34. For example, when a Java application program 36 creates a new object by instantiating a class, the heap memory allocation module 38 may receive a request from the Java application program 36 for heap memory that can be allocated to the new object.

The garbage collection module 42 may be configured to automatically recover the heap 34 when the heap 34 becomes full preventing new storage blocks and handles from being allocated therefrom. In particular, storage blocks and handles that are no longer in use are identified and are deallocated to free up memory in the heap 34. Storage blocks that remain in use may be moved to consolidate the free memory into larger blocks. In accordance with various alternative embodiments of the invention, the garbage collection module 42 may run periodically to free up memory in the heap and/or the garbage collection module 42 may run upon failure of the heap memory allocation module 38 to fulfill a heap memory request from an application.

The heap 34 may be configured as a portion of the memory 24 that is reserved for use by the Java application program(s) 36 for the temporary storage of data and/or information whose existence or size may not be able to be determined until the program(s) execute. In accordance with embodiments of the present invention, the heap 34 is configured with two, variable size sub-pools: a handle sub-pool 44 and a storage block sub-pool 46. The handle sub-pool 44 contains one or more handles, which are respectively associated with storage blocks in the storage block sub-pool, and may be used to provide indirect access to the storage blocks as discussed hereinabove. The storage block sub-pool 46 contains one or more storage blocks that may be respectively allocated, for example, to object(s) and/or for the storage of data or other information.

Figure 3:
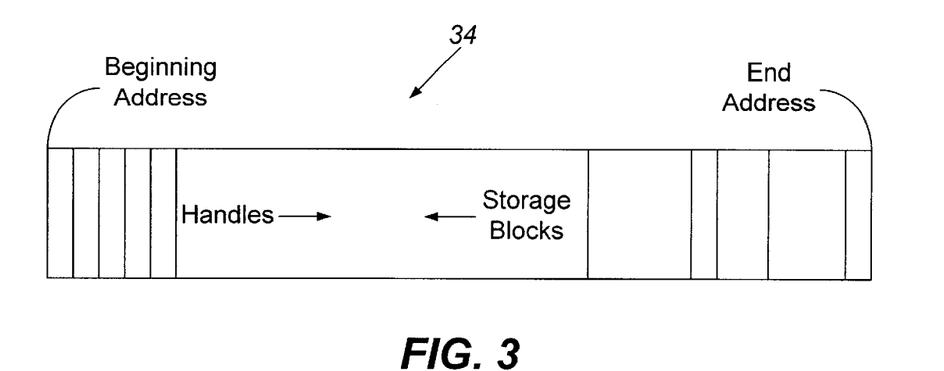
FIG. 3 is a diagram of a memory pool in accordance with embodiments of the present invention.

FIG. 3 illustrates an exemplary configuration of the heap 34, in accordance with embodiments of the present invention. As shown in FIG. 3, the variable size handle sub-pool 44 begins at a first end (i.e., the beginning address) of the heap 34 and extends towards a second end (i.e., the end address) of the heap 34 as the heap memory allocation module 38 allocates new handles. Conversely, the variable size storage block sub-pool 46 begins at the second end of the heap 34 and extends towards the first end of the heap 34 as the heap memory allocation module 38 allocates new storage blocks. Note that the individual storage blocks may vary in size, but the individual handles are all a fixed size because they contain fixed size pointers (i.e., addresses) and fixed size information about the respective storage blocks.

Finally, the Java application program(s) 36 represent any program or executable code, including, for example, the operating system 28, driver programs, utility programs, and traditional application programs (i e., programs designed to assist in the performance of a specific task), that may cooperate with the JVM 32 to use the heap 34.

Computer program code for carrying out operations of the present invention may be written in a high level programming language such as Java, C, or C++. In a preferred embodiment, the present invention uses the C programming language to implement most software programs. Nevertheless, it should be understood that the principles and concepts disclosed herein may also be applied to other programming languages.

The present invention is described hereinafter with reference to flowchart and/or block diagram illustrations of methods, systems, and computer program products for managing a memory pool according to embodiments of the present invention. It will be understood that each block of the flowchart and/or block diagram illustrations, and combinations of blocks in the flowchart and/or block diagram illustrations, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer-usable or computer-readable memory that can direct a computer or other programmable data processing apparatus to function in a particular manner, such that the instructions stored in the computer-usable or computer-readable memory produce an article of manufacture including instruction means that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Figure 4:
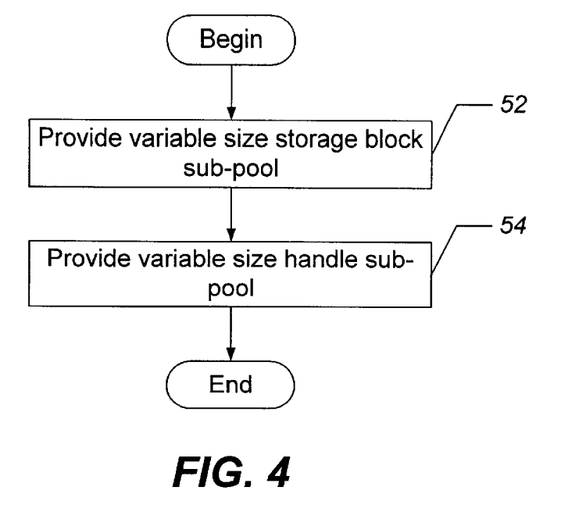
FIGS. 4–6 are flowcharts that illustrate exemplary memory pool management operations in accordance with embodiments of the present invention.

With reference to FIGS. 3–6, exemplary operations of methods, systems, and computer program products for managing a memory pool, in accordance with embodiments of the present invention, will be described hereafter. Referring now to FIG. 4, operations begin at blocks 52 and 54 where a variable size storage block sub-pool 46 and a variable size handle sub-pool 44 are provided in the heap 34. As shown in FIG. 3, in accordance with exemplary embodiments of the present invention, the storage block sub-pool 46 begins at an end address of the heap 34 and extends towards a beginning address of the heap 34 and the handle sub-pool 44 begins at the beginning address of the heap 34, and extends towards the end address of the heap 34.

Figure 5A:
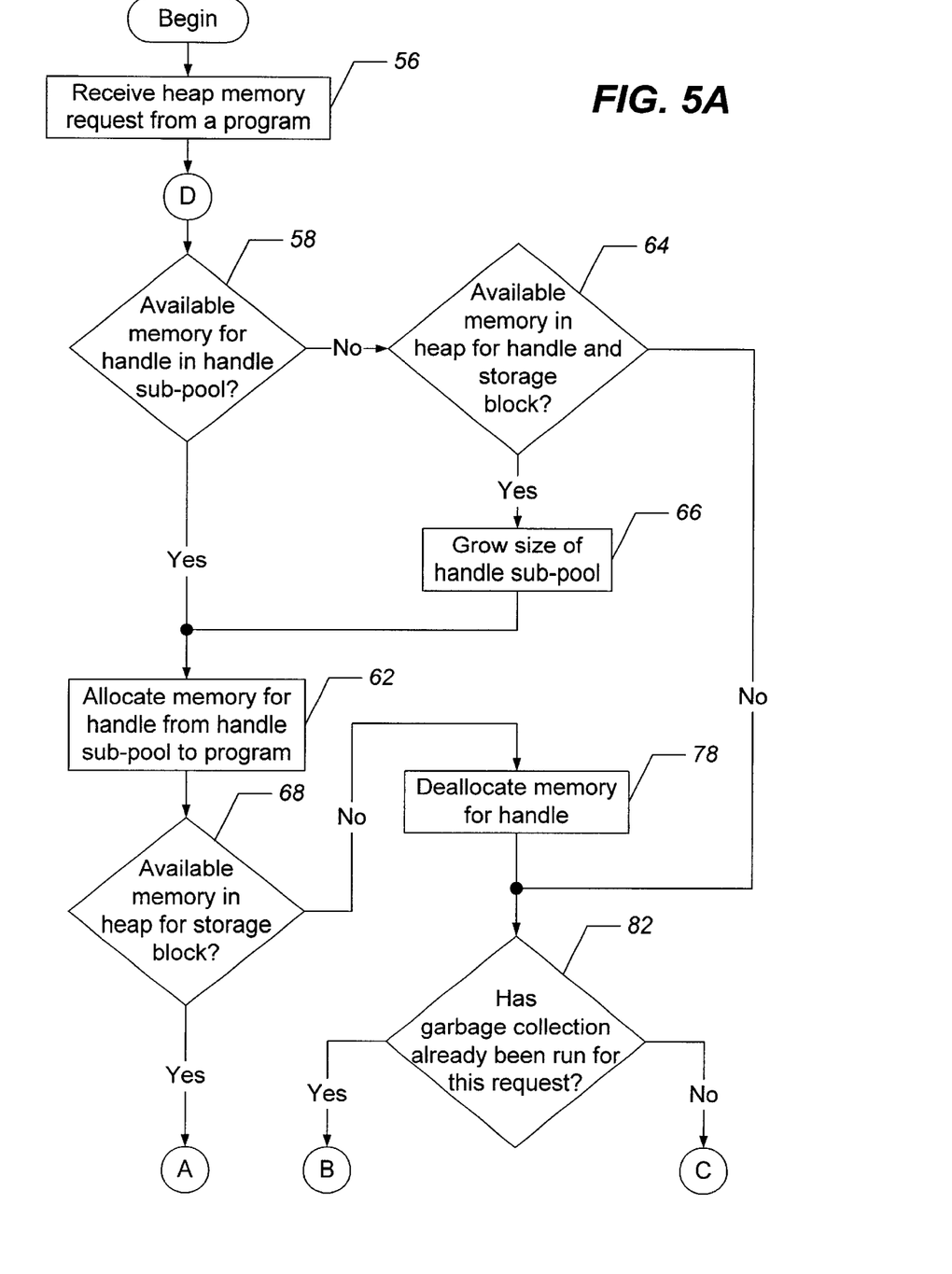
Figure 5B:
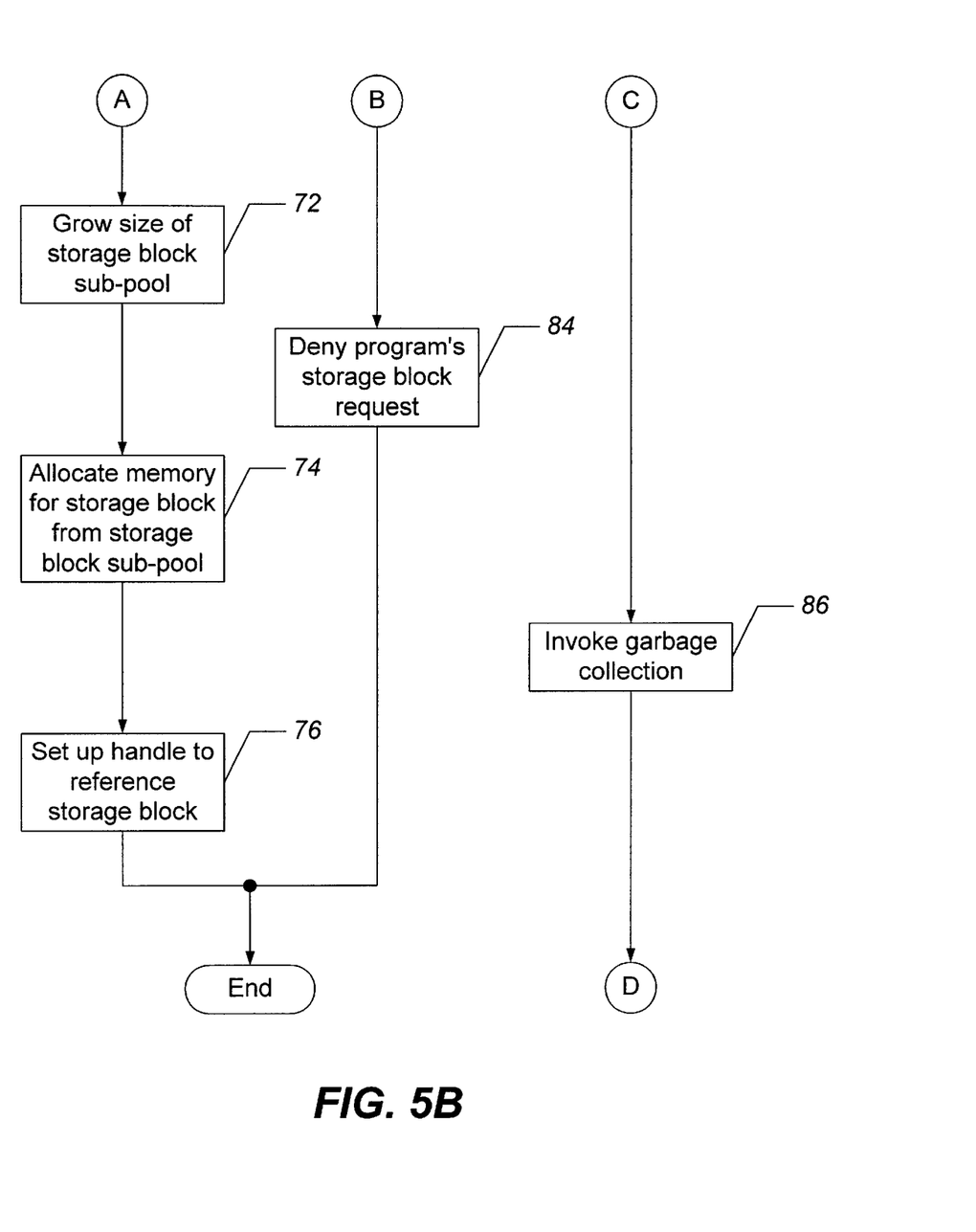

Referring now to FIGS. 5A and 5B, exemplary operations for processing a storage block request from a program will be described hereafter. At block 56, the heap memory allocation module 38 receives a heap memory request from a Java application program 36. The heap memory allocation module 38 makes a determination at block 58 whether there is unused memory (i.e., deallocated handle(s)) available in the handle sub-pool 44 to accommodate the heap memory request. If there is memory available in the handle sub-pool 44 to provide a handle to accommodate the storage block request, then the heap memory allocation module 38 allocates this memory for the handle at block 62.

If, however, the heap memory allocation module 38 determines at block 58 that there is not sufficient memory available in the handle sub-pool 44 to provide a handle for the storage block request, then the heap memory allocation module makes a determination at block 64 whether there is sufficient memory in the heap 34 to grant the storage block request. Specifically, the heap memory allocation module 38 determines whether the size of both the handle sub-pool 44 and the storage block sub-pool 46 may be increased to accommodate the storage block request without exceeding the size of the heap. In particular embodiments of the present invention in which the handle sub-pool 44 is disposed at one end of the heap 34 and the storage block sub-pool 46 is disposed at the other end of the heap 34 as shown in FIG. 3, the heap memory allocation module 38 may determine whether the size of the requested storage block and the handle that is associated with the requested storage block exceeds the size of the available memory in the middle of the heap 34 between the ends of the handle sub-pool 44 and the storage block sub-pool 46.

If there is memory available in the heap 34 to grant the storage block request as determined by the heap memory allocation module 38 at block 64, then the heap memory allocation module 38 grows the size of the handle sub-pool 44 at block 66. Operations continue at block 62 where the heap memory allocation module 38 allocates memory from the handle sub-pool 44 to accommodate the heap memory request as discussed hereinabove.

At block 68, the heap memory allocation module 38 may optionally determine whether there is sufficient memory in the heap 34 to accommodate the requested storage block. Note that this operation may not be performed if the heap memory allocation module 38 determined at block 64 that the heap 34 has sufficient memory to accommodate both the requested storage block and associated handle. If the heap memory allocation module 38 determines that the heap 34 has sufficient memory to accommodate the requested storage block at block 68, then operations continue by following connector A to FIG. 5B where the heap memory allocation module 38 grows the size of the storage block sub-pool 46 at block 72. Next, the heap memory allocation module 38 allocates memory for the requested storage block from the storage block sub-pool 46 at block 74 and then associates the handle, which was allocated for the present storage block request at block 62, with the allocated storage block at block 76. Specifically, the handle contains a pointer that identifies the location of the allocated storage block in the storage block sub-pool 46.

In view of the foregoing, if a heap memory request is based on the creation of a new object, for example, then the requested storage block is allocated to the new object and the new object may be indirectly accessed through the handle associated with the requested storage block. To grant the heap memory request, the heap memory allocation module 38 increases the size of the storage block sub-pool 46 based on the size of the requested storage block and may also increase the size of the handle sub-pool 44 if the handle sub-pool 44 does not contain any unused memory (i.e., deallocated handle(s)), which may be used to provide the handle for the instant storage block request. Each handle contains a pointer and other fixed size information; therefore, when the handle sub-pool 44 is grown, the handle sub-pool's size increases by a fixed amount. By contrast, the storage blocks may vary in size; therefore, the size of the storage block sub-pool increases according to the size of the requested storage block. In particular embodiments of the present invention in which the handle sub-pool 44 is disposed at one end of the heap 34 and the storage block sub-pool 46 is disposed at the other end of the heap 34 as shown in FIG. 3, the end of the handle sub-pool 44 is extended towards the end address of the heap 34 based on the size of the handle and the end of the storage block sub-pool 46 is extended towards the beginning address of the heap 34 based on the size of the requested storage block.

Advantageously, the present invention may provide for improved utilization of the heap 34. Handles and storage blocks have different characteristics: handles generally are small and have a fixed size and storage blocks may vary in both size and usage. By allocating handles and storage blocks in separate, variable sized sub-pools, each data type may be allowed to consume and release heap 34 memory in accordance with the requirements of a particular application. New handles and storage blocks may be allocated until the heap 34 is filled. Inasmuch as the heap is shared between handles and storage blocks, the problem of having a fill heap even though space is still available in one of the sub-pools may be avoided. In addition, the improved utilization of the heap 34 may allow for a smaller heap size, which conserves memory.

Returning to FIG. 5A, if the heap memory allocation module 38 determines that there is insufficient memory in the heap 34 to accommodate the heap memory request at block 68, then, at block 78, the heap memory allocation module 38 deallocates the memory for the handle that had been allocated from the handle sub-pool 44 at block 62. Operations continue at block 82 after the handle has been deallocated at block 78 or if the heap memory allocation module 38 determines at block 64 that there is insufficient memory in the heap 34 for both the handle and the storage block. At block 82, the heap memory allocation module 38 determines whether garbage collection has been run for the present heap memory request. If garbage collection has already been run, then operations continue by following connector B to FIG. 5B where the heap memory allocation module 38 denies the program's heap memory request at block 84. If, however, garbage collection has not already been run, then operations continue by following connector C to FIG. 5B where the heap memory allocation module 38 invokes garbage collection at block 86 to reclaim memory in the heap 34 that is no longer in use. After garbage collection is complete, operations continue by following connector D to FIG. 5A where another attempt is made by the heap memory allocation module 38 to fulfill the program's heap memory request as discussed hereinabove.

Figure 6:
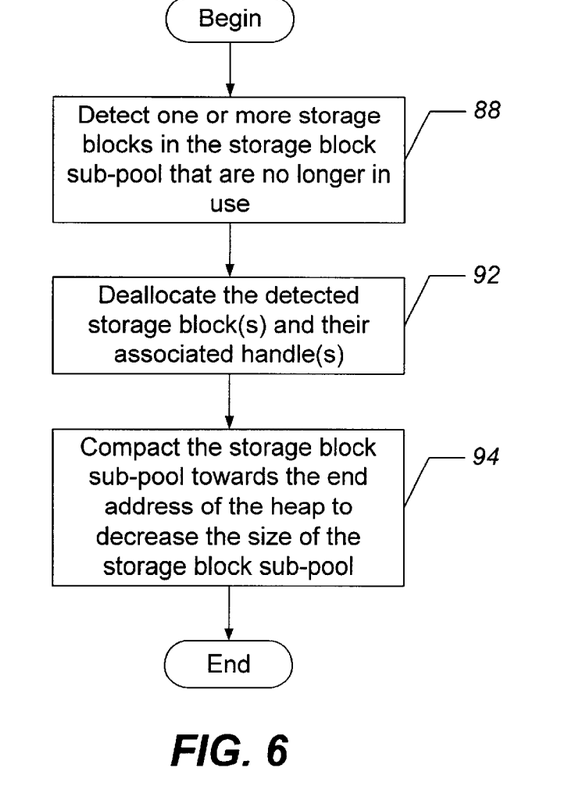

Referring now to FIG. 6, exemplary operations for reclaiming memory in the heap 34 that is no longer in use, in accordance with embodiments of the present invention, will be described hereafter. At block 88, the garbage collection module 42 detects one or more storage blocks that are no longer in use. This detection operation may be implemented, for example, by keeping track of references (e.g., pointers) to the handles associated with each allocated storage block. As long as there are remaining references, the storage block is maintained in the heap 34. If, however, there are no remaining references, then the storage block may be deallocated. Keeping track of references is one exemplary technique that may be used to detect unused heap memory. As will be understood by those skilled in the art, other techniques may be used to detect unused heap memory in accordance with embodiments of the present invention.

The storage block(s) that are detected as no longer being in use may be deallocated along with their associated handle(s) at block 92. Heap 34 memory may be reclaimed by rearranging the storage blocks that are in use to compact the size of the storage block sub-pool 46 at block 94. In particular embodiments of the present invention in which the storage block sub-pool 46 begins at one end of the heap 34 (i.e., the end address of the heap 34) as shown in FIG. 3, the storage block sub-pool may be compacted towards that end of the heap 34 where the storage block sub-pool 46 begins. Thus, the end of the storage block sub-pool 46 may be retracted towards the end of the heap 34 where the storage block sub-pool 46 begins based on the size of the storage block(s) that have been deallocated.

It should be further understood that the garbage collection module 42 may execute as a background process to defragment the storage block sub-pool 46 on a periodic basis. Advantageously, because of the improved heap 34 utilization provided by the present invention as described hereinabove, the garbage collection module 42 may be run less frequently to free up heap memory. Accordingly, processor resources may be conserved.

The flowcharts of FIGS. 4–6 illustrate the architecture, functionality, and operations of possible implementations of the heap memory allocation module 38 and garbage collection module 42 software. In this regard, each block may represent a module, segment, or portion of code, which comprises one or more executable instructions for implementing the specified logical function(s). It should also be noted that in some alternative implementations, the functions noted in the blocks may occur out of the order noted in FIGS. 4–6. For example, two blocks shown in succession may in fact be executed substantially concurrently or the blocks may be executed in the reverse order, depending on the functionality involved.

In concluding the detailed description, it should be noted that many variations and modifications can be made to the preferred embodiments without substantially departing from the principles of the present invention. All such variations and modifications are intended to be included herein within the scope of the present invention, as set forth in the following claims.

We claim:

1. A method of managing a memory pool, comprising the steps of:
   providing a variable size object storage block sub-pool within the memory pool, the object storage block sub-pool beginning at a first end of the memory pool;
   providing a variable size handle sub-pool within the memory pool, the variable size handle sub-pool beginning at a second end of the memory pool;
   receiving a heap memory request from a program;
   extending an end of the object storage block sub-pool towards the second end of the memory pool based on a size of an object storage block to increase a size of the object storage block sub-pool only if a combined size of the object storage block and an associated handle does not exceed a size of an available region of the memory pool between the end of the object storage block sub-pool and the end of the handle sub-pool, the size of the available region being determined without moving either of the ends of the storage block sub-pool and the handle sub-pool;
   extending an end of the handle sub-pool towards the first end of the memory pool based on a size of the associated handle to increase the size of the handle sub-pool only if the combined size of the object storage block and the associated handle does not exceed the size of an available region of the memory pool between the end of the object storage block sub-pool and the end of the handle sub-pool, the size of the available region being determined without moving either of the ends of the storage block sub-pool and the handle sub-pool; and
   allocating to the program the object storage block and the handle, which is associated with the object storage block, from the object storage block and handle sub-pools, respectively.

2. A method as recited in claim 1, herein the step of extending an end of the handle sub-pool towards the first end of the memory pool comprises the steps of:
   determining if the handle sub-pool contains a deallocated handle; and
   extending an end of the handle sub-pool towards the first end of the memory pool based on the size of the associated handle to increase the size of the handle sub-pool if the handle sub-pool does not contain a deallocated handle and if the combined size of the object storage block and the associated handle does not exceed the size of an available region of the memory pool between the end of the object storage block sub-pool and the end of the handle sub-pool.

3. A method as recited in claim 1, further comprising:
   detecting at least one object storage block in the object storage block sub-pool that is no longer in use;
   deallocating the detected at least one object storage block and at least one handle that is associated therewith; and
   compacting the object storage block sub-pool towards the first end of the memory pool based on a size of the deallocated at least one object storage block to decrease the size of the object storage block sub-pool.

4. A system for managing a memory pool, comprising:
   a variable size object storage block sub-pool within the memory pool that begins at a first end of the memory pool;
   a variable size handle sub-pool within the memory pool that begins at a second end of the memory pool;
   means for extending an end of the object storage block sub-pool towards the second end of the memory pool based on a size of an object storage block to increase a size of the object storage block sub-pool only if a combined size of the object storage block and an associated handle does not exceed a size of an available region of the memory pool between the end of the object storage block sub-pool and the end of the handle sub-pool, the size of the available region being determined without moving either of the ends of the storage block sub-pool and the handle sub-pool;
   means for extending an end of the handle sub-pool towards the first end of the memory pool based on a size of the associated handle to increase the size of the handle sub-pool only if the combined size of the object storage block and the associated handle does not exceed the size of an available region of the memory pool between the end of the object storage block sub-pool and the end of the handle sub-pool, the size of the available region being determined without moving either of the ends of the storage block sub-pool and the handle sub-pool; and
   means for allocating to the program the object storage block and the handle, which is associated with the object storage block, from the object storage block and handle sub-pools, respectively.

5. A system as recited in claim 4, wherein the means for extending an end of the handle sub-pool towards the first end of the memory pool comprises:
   means for determining if the handle sub-pool contains a deallocated handle; and
   means for extending an end of the handle sub-pool towards the first end of the memory pool based on the size of the associated handle to increase the size of the handle sub-pool if the handle sub-pool does not contain a deallocated handle and if the combined size of the object storage block and the associated handle does not exceed the size of an available region of the memory pool between the end of the object storage block sub-pool and the end of the handle sub-pool.

6. A system as recited in claim 4, further comprising:
   means for detecting at least one object storage block in the object storage block sub-pool that is no longer in use;
   means for deallocating the detected at least one object storage block and at least one handle that is associated therewith; and
   means for compacting the object storage block sub-pool towards the first end of the memory pool based on a size of the deallocated at least one object storage block to decrease the size of the object storage block sub-pool.

7. A system as recited in claim 4, wherein the handle contains a pointer and fixed size information for the object storage block.

8. A computer program product for managing a memory pool, comprising:
- a computer readable storage medium having computer readable program code embodied therein, the computer readable program code comprising:
  - computer readable program code that is configured to provide a variable size object storage block sub-pool within the memory pool, the object storage block sub-pool beginning at a first end of the memory pool;
  - computer readable program code that is configured to provide a variable size handle sub-pool within the memory pool, the variable size handle sub-pool beginning at a second end of the memory pool;
  - computer readable program code for extending an end of the object storage block sub-pool towards the second end of the memory pool based on a size of an object storage block to increase a size of the object storage block sub-pool only if a combined size of the object storage block and an associated handle does not exceed a size of an available region of the memory pool between the end of the object storage block sub-pool and the end of the handle sub-pool, the size of the available region being determined without moving either of the ends of the storage block sub-pool and the handle sub-pool;
  - computer readable program code for extending an end of the handle sub-pool towards the first end of the memory pool based on a size of the associated handle to increase the size of the handle sub-pool only if the combined size of the object storage block and the associated handle does not exceed the size of an available region of the memory pool between the end of the object storage block sub-pool and the end of the handle sub-pool, the size of the available region being determined without moving either of the ends of the storage block sub-pool and the handle sub-pool; and
  - computer readable program code for allocating to the program the object storage block and the handle, which is associated with the object storage block, from the object storage block and handle sub-pools, respectively.

9. A computer program product as recited in claim 8, wherein the computer readable program code for extending an end of the handle sub-pool towards the first end of the memory pool comprises:
- computer readable program code for determining if the handle sub-pool contains a deallocated handle; and
- computer readable program code for extending an end of the handle sub-pool towards the first end of the memory pool based on the size of the associated handle to increase the size of the handle sub-pool if the handle sub-pool does not contain a deallocated handle and if the combined size of the object storage block and the associated handle does not exceed the size of an available region of the memory pool between the end of the object storage block sub-pool and the end of the handle sub-pool.

10. A computer program product as recited in claim 8, further comprising:
- computer readable program code for detecting at least one object storage block in the object storage block sub-pool that is no longer in use;
- computer readable program code for deallocating the detected at least one object storage block and at least one handle that is associated therewith; and
- computer readable program code for compacting the object storage block sub-pool towards the first end of the memory pool based on a size of the deallocated at least one object storage block to decrease the size of the object storage block sub-pool.

11. A computer program product as recited in claim 8, wherein the handle contains a pointer and fixed size information for the object storage block.

* * * * *